Aug. 23, 1927.   L. D. KAY   1,640,338
DUAL TIRED TRUCK WHEEL
Filed Aug. 19, 1925
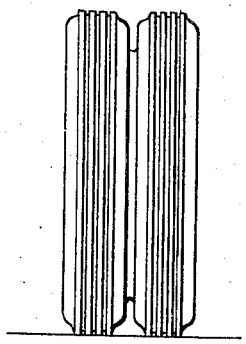
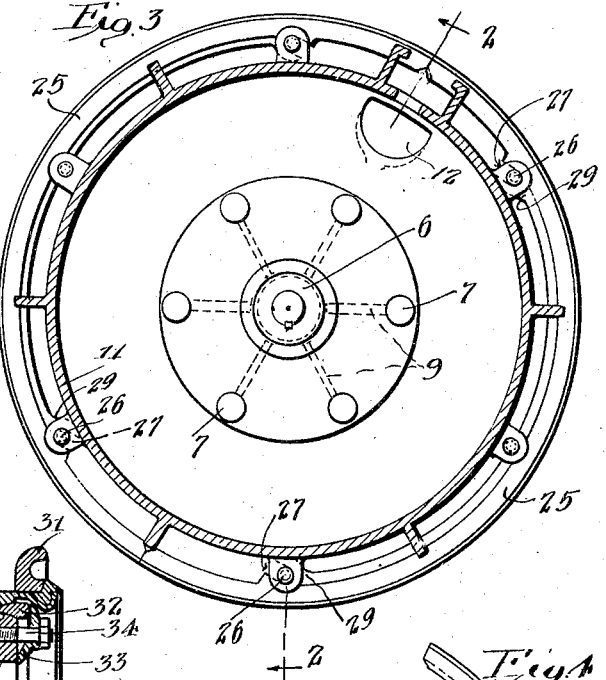
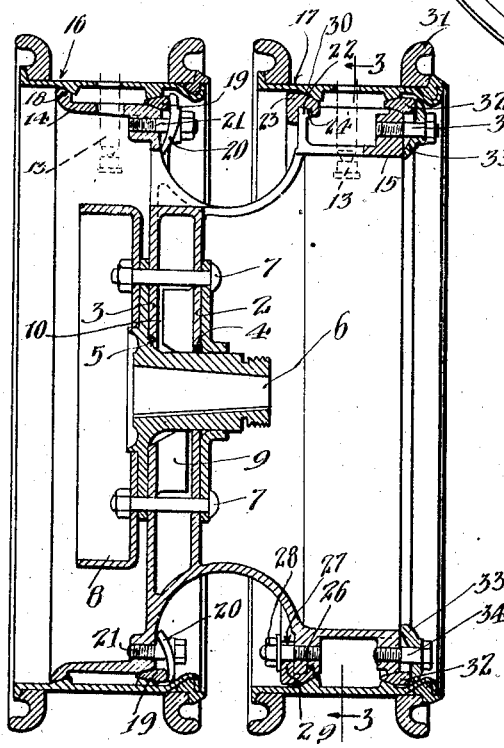
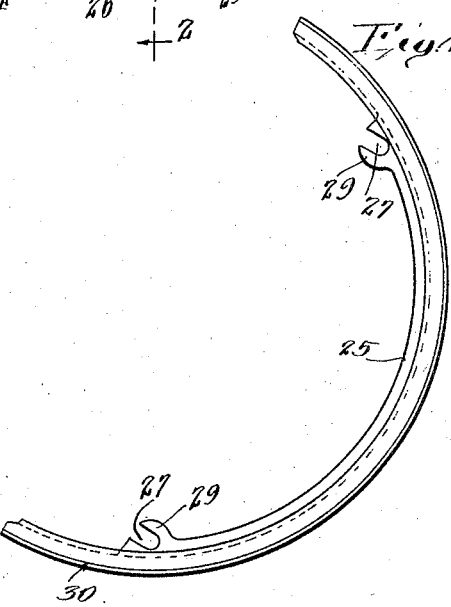
Inventor
Lloyd D. Kay
By Lyon & Lyon
Attorneys Patented Aug. 23, 1927.

1,640,338

UNITED STATES PATENT OFFICE.

LLOYD D. KAY, OF LOS ANGELES, CALIFORNIA.

DUAL-TIRED TRUCK WHEEL.

Application filed August 19, 1925. Serial No. 51,149.

This invention relates to vehicle wheels and the invention is particularly applicable to the wheels of automobile trucks, of the type illustrated in my Patent. No. 1,526,913, for dual truck wheel, dated February 17, 1925. In the specification of that patent I disclosed a tire-rim seat which was secured to the felloe of the wheel by studs but the construction was such that the lateral thrust of the tire-rim upon the seat in one direction is resisted only by the studs.

The general object of this invention is to improve the construction of wheels of this type and to provide a wheel in which the tire-rim seat and the wheel are correlated so that the rim seat can be readily put in place and when secured will impart all lateral thrust forces directly to the wheel, the bolts being merely necessary to hold the tire-rim seat in place; also to provide an improved general construction for the wheel which will facilitate mounting the tire-rim seat and the outer tire-rim on the felloe of the wheel.

Further objects of the invention will appear hereinafter.

The invention consists in the novel parts and combination of parts to be described hereinafter, all of which contribute to produce an efficient dual tired truck wheel.

A preferred embodiment of the invention is described in the following specification, while the broad scope of the invention is pointed out in the appended claims.

In the drawing:

Fig. 1 is a front elevation of a dual-tired wheel embodying my invention.

Fig. 2 is a cross-section taken through the wheel about on the line 2—2 of Fig. 3.

Fig. 3 is a vertical section through the wheel taken about on the line 3—3 of Fig. 2.

Fig. 4 is a side elevation of one of the sections of a rim-seat which constitutes a feature of my invention.

In practicing my invention, I prefer to construct the wheel as a steel casting. The body of the wheel is constructed with a bifurcated center disc, that is to say, it consists of two webs 2 and 3 which are disposed apart, see Figure 2. These webs have aligning openings 4 and 5, respectively, to receive a hub 6 constructed as a separate piece which may be secured by bolts 7 to the disc. If desired, these same bolts may be utilized to secure a brake-drum 8 to the wheel.

The inner faces of the webs 2 and 3 are provided with integral ribs 9 which extend substantially radially from the inner edges of the openings, and the inner ends of these ribs bear against the outer face of the hub 6, see Figure 2. I provide a plurality of these ribs, for example six, as shown in Figure 3, and they extend inwardly, that is, at right angles to the plane of the web, and are carried alternately on the opposite webs. Preferably each rib terminates short of the opposite web, leaving a slot 10 between the edge of each rib and the opposite web. The presence of these slots is advantageous because it prevents the formation of strains in the casting in the vicinity of the hub when the metal cools. At the same time, the fact that the inner ends of the ribs rest against the hub gives the center of the wheel substantially the same strength as though it had a circumferential wall at this point. In other words, the webs take part of the compression forces imparted from the hub to the wheel, and stiffen the webs. It will be evident that a wheel having this construction for its center can readily be bored to different diameters without substantially reducing the strength of the wheel.

The wheel has a large channel shaped rim 11 which extends continuously around the wheel, but this rim is provided with a gap 12 at one point of its circumference to prevent it from interfering with passing the inflating nipples 13 (shown in dotted lines) into place when the tires are put on the wheel.

The rim 11 has a dual character, that is to say, it has an integral inner felloe 14, integrally connected with the inner edge of the channel or half-round rim 11, and it has an outer felloe 15 which is formed integrally on the outer side of the rim 11.

The tires are carried on two tire-rims 16 and 17 which may be constructed exactly alike. The inner felloe 14 is provided with an inclined face 18 which operates as a rim seat and upon which rests a corresponding inclined seat-face formed on the inner face of the inner tire-rim 16. Near its outer edge, the tire rim 16 is secured in place by the usual wedge ring 19 held in place by clamps 20 and stud bolts 21.

In order to mount the outer tire-rim 17 in place, I construct the outer felloe 15 with a circumferential felloe-member 22, see Figure 2, which extends continuously around the wheel. This felloe-member receives a rim-seat 23 in the form of a ring having a groove 24 on its inner face which fits to the felloe member 22 with a machine fit. This rim-seat 23 is constructed in sections, preferably two sections 25, and each section is constructed so that it will come into place on the felloe member 22 by a radial inward movement. In addition to this, I provide means for preventing circumferential movement of the sections 25 on the felloe-member 22, and for this purpose I provide an interlocking connection between the felloe and the sections 25. This is preferably accomplished by providing a plurality of studs 26 which project laterally from the felloe-member, and also by providing sockets 27 on the sections 25 which receive the studs when the sections are shoved into place. The sockets co-operate with the studs to prevent circumferential shifting of the sections 25, and when the rim 17 is in place they will be securely held on the wheel. However, in order to provide additional security for the sections 25, I prefer to provide the studs 26 with nuts 28 which may be clamped up against the lugs 29 in which the sockets 27 are formed.

The rim-seat 23 is preferably formed with an inclined or conical seat-face 30 upon which seats a corresponding seat face on the inner face of the tire-rim 17. Any suitable means may be provided for securing the other edge, or outer edge 31 of the rim 17 to the felloe. This construction may be a substantial counterpart of that illustrated in connection with the inner tire-rim 16, that is to say, involving the use of a wedge-ring 32 held in place by clamps 33 and stud-bolts 34.

The tires may be held on the rims in any suitable manner, for example, by means of standard construction illustrated.

It will be evident that when the rim-seat 23 is not in place, the inner tire-rim 16 may be readily passed over the outer felloe 15 in putting it in place. After the inner rim with its tire has been put on, then the rim-seat 23 should be put in place, and the outer tire rim 17 mounted on the rim-seat and then secured to the wheel at its outer edge 31.

Wheels embodying my invention may be readily made of cast steel with a wall thickness of one quarter inch for the webs and the other parts of the wheel producing a wheel of about 125 pounds weight which will support a load of 6 tons.

The webs 2 and 3 are disposed sufficiently far apart to give sufficient strength to the disc as a support for the arched or half-round rim 11. In other words, the web 2 is near enough to the middle plane of the wheel to give sufficient strength to the overhanging portion of the rim.

It is understood that the embodiment of the invention described herein is only one of the many embodiments this invention may take, and I do not wish to be limited in the practice of the invention, nor in the claims, to the particular embodiment set forth.

What I claim is:

1. In a truck wheel, the combination of a wheel-body having a felloe with a circumferential felloe member, a rim-seat having a groove on its inner face receiving the felloe member and fitting the same, said rim-seat consisting of sections constructed to come upon the felloe-member by an inward radial movement, means for preventing circumferential movement of the rim-seat with respect to the felloe-member, said rim-seat having a seat-face on its outer side for a tire-rim, and means for securing the tire-rim to the felloe adjacent the outer side of the wheel.

2. In a truck wheel, the combination of a wheel-body having a felloe with a circumferential felloe-member, a rim-seat having a groove on its inner face receiving the felloe-member and fitting the same, said rim-seat consisting of sections constructed to come upon the felloe-member by an inward radial movement, interlocking means connecting the felloe-member and the rim-seat operating to prevent circumferential movement of the rim-seat with respect to the felloe-member, said rim-seat having an inclined seat-face on its outer side for a tire-rim, and means carried by the wheel for securing a tire-rim to the felloe adjacent the outer side of the wheel.

3. In a truck wheel, the combination of a wheel-body having a felloe with a circumferential felloe-member having studs projecting therefrom, a rim-seat having a groove on its inner face receiving the felloe member and fitting the same, said rim-seat consisting of sections with sockets to receive the studs and constructed to come upon the felloe-member and engage the sockets with the studs by an inward radial movement of the rim-seat section, said rim-seat having a seat-face on its outer side for a tire-rim, and means carried by the wheel for securing a tire-rim to the felloe adjacent the outer edge of the wheel.

4. In a truck wheel, the combination of a wheel-body having a felloe with a circumferential felloe-member having studs projecting laterally therefrom, a rim-seat having a groove on its inner face receiving the felloe-member and fitting the same, said rim-seat consisting of two sections, each section having a pair of sockets and constructed to come upon the felloe-member by an inward radial movement with the sockets receiving the studs and co-operating with the studs to prevent circumferential movement of the rim-seat with respect to the felloe-member, said rim-seat having an inclined seat-face on its outer side, and means carried by the wheel for securing a tire-rim to the felloe adjacent the outer side of the wheel.

Signed at Los Angeles, California this 11 day of August, 1925.

LLOYD D. KAY.